Sept. 6, 1960    J. E. CANDLIN, JR    2,951,455
SUSPENSION SYSTEM
Filed March 16, 1956    3 Sheets-Sheet 2
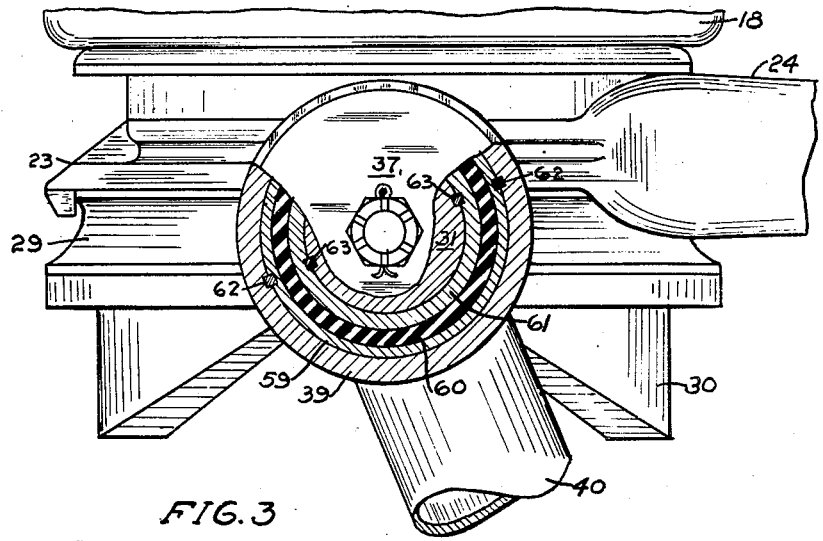
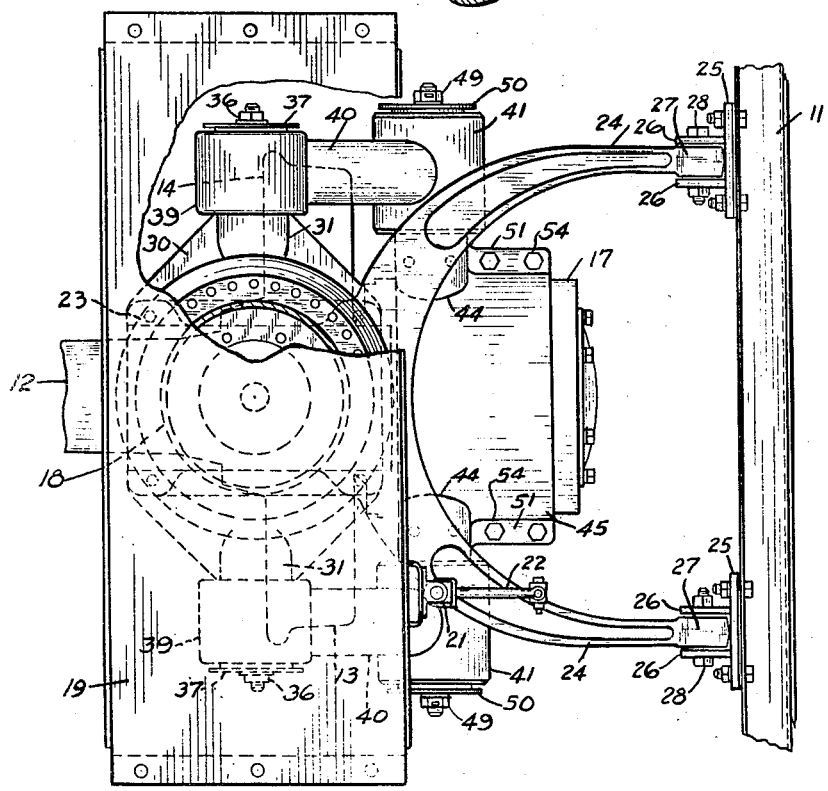
INVENTOR
JAMES E. CANDLIN JR.
BY Cromwell, Greist & Warden
ATTORNEYS Sept. 6, 1960

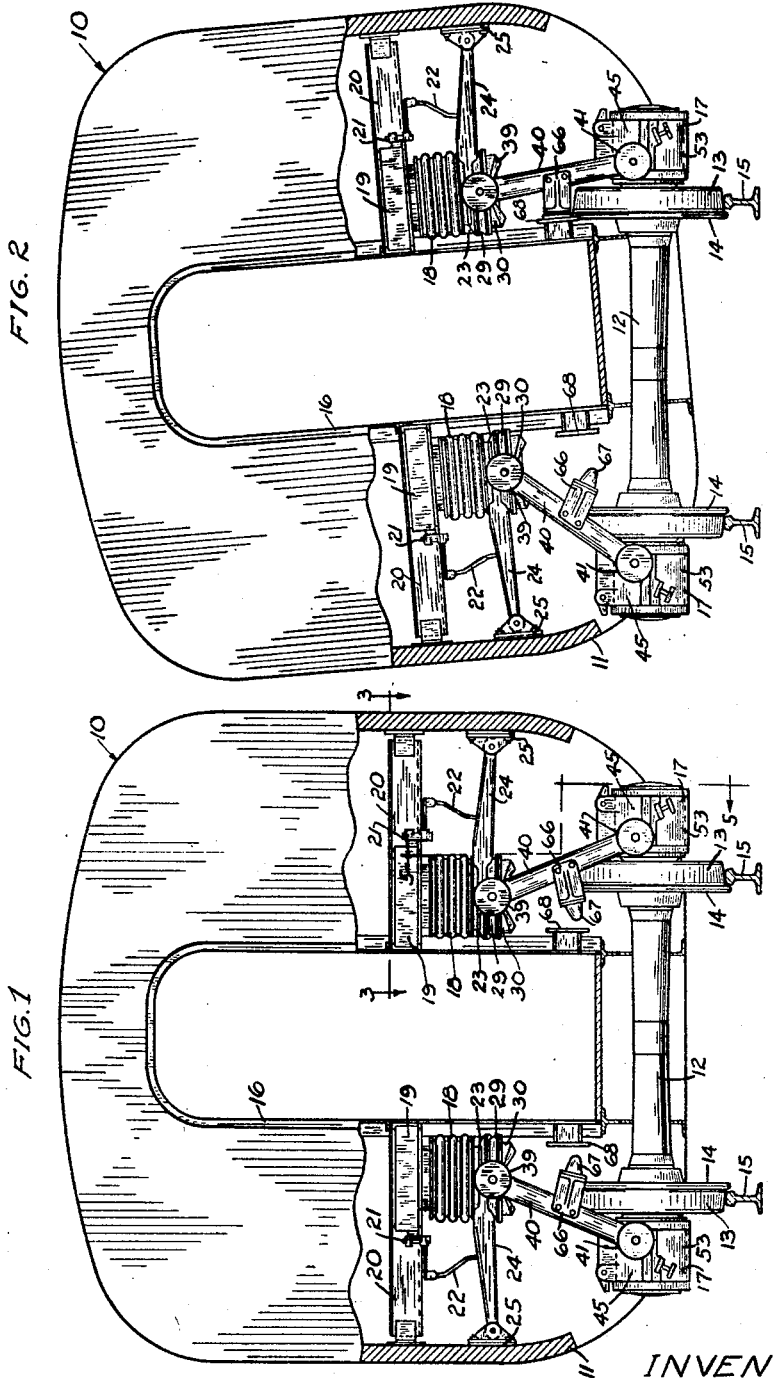

J. E. CANDLIN, JR 2,951,455

SUSPENSION SYSTEM

Filed March 16, 1956

INVENTOR
JAMES E. CANDLIN JR
BY Cromwell, Greist & Warden
ATTORNEYS

United States Patent Office 2,951,455
Patented Sept. 6, 1960

2,951,455
SUSPENSION SYSTEM

James E. Candlin, Jr., Lansing, Ill., assignor to Pullman-Standard Car Manufacturing Company, Chicago, Ill., a corporation of Delaware Filed Mar. 16, 1956, Ser. No. 571,865

3 Claims. (Cl. 105—453)

The present invention relates generally to a suspension system for resiliently supporting a vehicle body with respect to an axle associated therewith, the vehicle body being movable with respect to the axle by reason of the suspension system. More specifically, the present invention is directed to a new and improved suspension system particularly adapted for use in lightweight, high speed railway cars each being provided with but a single axle. The suspension system controls lateral movement or roll of such a car body with respect to the axle by means of torsion members normally acting to maintain the car body in an upright position while allowing the car to bank inwardly during the negotiation of a curve.

The suspension system of the present invention is readily adapted for use in any type of vehicle where it is desired to resiliently support the body of the vehicle with respect to an axle associated therewith. While this suspension system is particularly adapted for use with lightweight, high speed railway cars of the single axle variety and the following description is directed to such use, it is not intended thereby to limit the uses for which the suspension system is readily adapted.

In order to improve passenger service and operating efficiency the railroad industry has turned to the use of lightweight, high speed trains which may be formed from a plurality of single axle cars interconnected in load-bearing support with one another. Where a plurality of such cars are used, the single axle of each of the cars is placed near one end of the car thereby establishing a wheel-supported end and a car-supported end. The car-supported ends of such cars are placed in load-bearing support with the wheel supported ends of adjacent cars to form a train consist which is of reduced over-all weight and adapted to be operated at higher speeds in comparison with conventional equipment.

In order to improve the riding comfort of the passengers when such trains are operated at high speeds, it has been found desirable to make use of suspension systems which allow the car bodies to bank inwardly of a curve when the individual cars negotiate the curve. Banking to this extent in response to the action of centrifugal force upon the rounding of a curve materially improves the riding comfort as the passengers are not subjected to the action of centrifugal force in such a manner that they are tipped uncomfortably from side to side in their seats.

In order to resiliently mount a car body on a single axle to allow the car body to bank inwardly when rounding a curve without jeopardizing the proper maintenance of wheel contact with the rails, it has been found desirable to mount the car body on the axle in such a manner that the body rolls or pivots about a point centrally located in the car body. To bring this about the car body is designed with a low center of gravity positioned below the pivot point about which the body rolls.

Efforts have been made to develop suspension systems particularly adapted for use with lightweight, high speed railway cars of the type described above, which allow a car body to bank inwardly of a curve upon the rounding of the same to improve riding comfort as well as safety of operation at higher speeds. However, in considering the various suspension systems developed it has been found that these systems are either too costly from the standpoints of manufacture and maintenance, too bulky and thereby cut down available passenger revenue space, or are incapable of operating properly under varied operating conditions.

It is an object of the present invention to provide a new and improved suspension system which is inexpensive to manufacture and maintain; rugged; compact so as to permit maximum use of available passenger revenue space; readily and easily serviced; and, capable of operating under encounterable conditions to allow the car body to safely and comfortably bank during the rounding of a curve.

Still another object is to provide a new and improved suspension system which is provided with spaced pivot points about which certain elements of the system limitedly pivot in response to the action of centrifugal force on the car body when the same is rounding a curve to allow the car body to bank inwardly of the curve, and which pivot points are so located with respect to the car body that the elements defining these points operate to not only allow the car body to comfortably and safely roll in response to the action of centrifugal force but normally urge the same into an upright position.

A further object is to provide an improved suspension system which includes the use of vertically acting fluid pressurized springs, lateral movement control means and spring restraining means; the springs functioning primarily to carry the weight of the vehicle body in cooperation with the lateral movement control means which in turn function primarily to allow the vehicle body to bank in response to the action of centrifugal force; and the spring restraining means cooperating with both the springs and the lateral movement control means to maintain the elements of the suspension system, the vehicle body and the axle in their proper operative relation with one another.

An additional object in conjunction with the foregoing is to provide an improved suspension system utilizing spaced pivot points to allow a car body to bank in response to the action of centrifugal force, the pivot points each being provided with rubber torsion bushings which include elements fixed with respect to relatively movable members of the suspension system to resiliently interconnect the same.

Other objects not specifically set forth will become apparent from the following detailed description made in conjunction with the drawings, wherein:

Fig. 1 is an end elevation partly broken away and in section of a lightweight railway car provided with the improved suspension system of the present invention;

Fig. 2 is a view like Fig. 1 illustrating the banking of the car body as allowed by the suspension system during the negotiation of a curve;

Fig. 3 is an enlarged top plan view partly broken away and in section of one side assembly of the suspension system taken generally along line 3—3 of Fig. 1;

Fig. 6 is an enlarged fragmentary end elevation in partial section of one of the pivot points of the suspension system which allows banking of the car body.

Figures 4, 5:
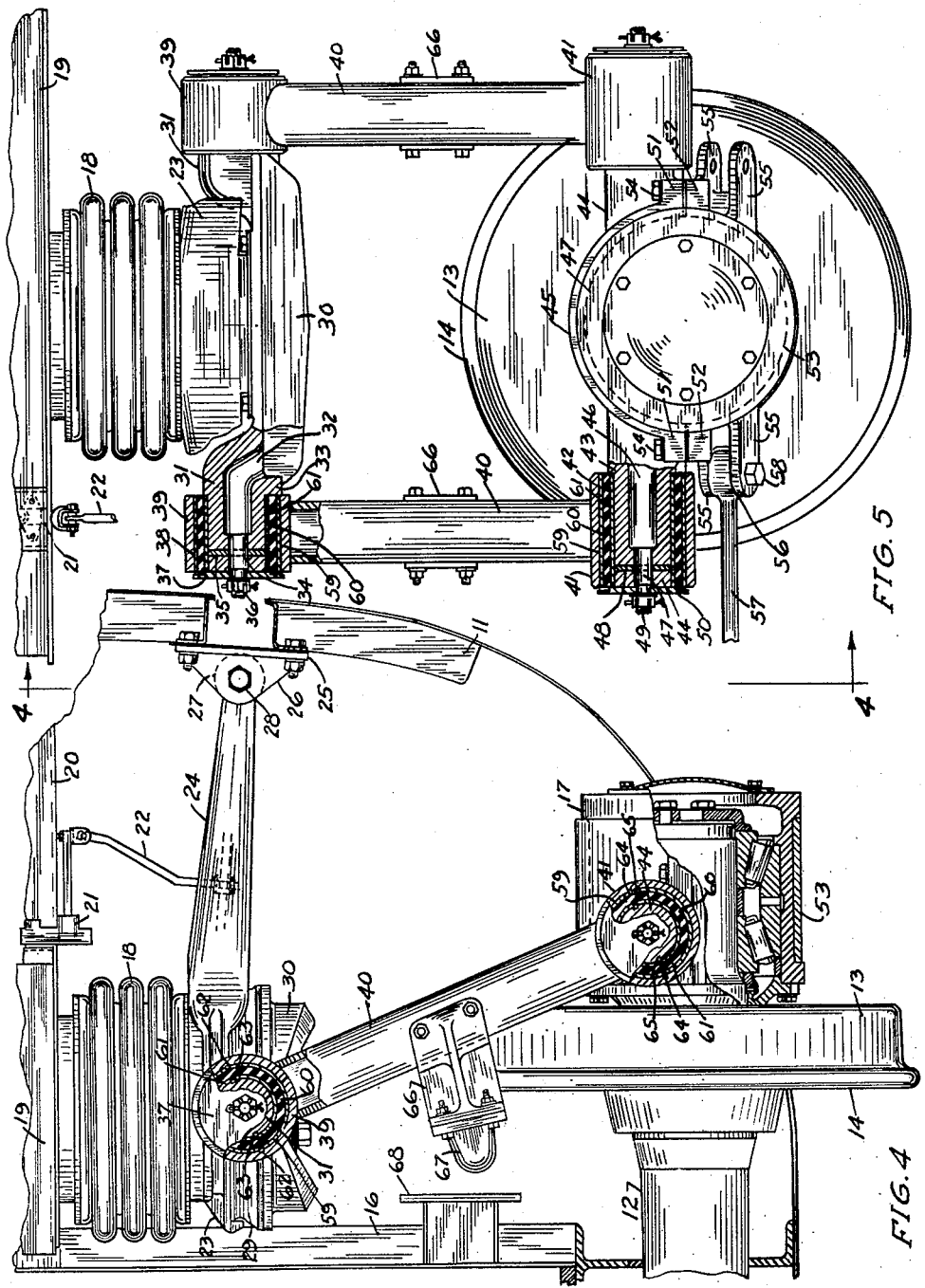
Fig. 4 is an enlarged fragmentary end elevation in partial section taken generally along line 4—4 of Fig. 5.
Fig. 5 is an enlarged fragmentary side elevation in partial section taken generally along line 5—5 of Fig. 1.

In Figs. 1 and 2 the wheel supported end of a lightweight, high speed, single axle railway car 10 is illustrated, this car being provided with a car body 11 and an axle 12 carrying the usual rail wheels 13 provided with wheel flanges 14 which ride the inner surfaces of rails 15. The car body 11 is provided with a passageway frame 16 and the axle 12 extends into journal boxes 17 outwardly of each of the wheels 13. The journal boxes 17 constitute elements of the suspension used to mount the car body 11.

The suspension system consists of duplicate suspension assemblies for opposite sides of the car 11 as shown in Figs. 1 and 2. Figs. 3–5 illustrate only one of these suspension assemblies since both are identical in construction. Like elements of each assembly shown in Figs. 1 and 2 are designated by like reference numerals.

Immediately outwardly of the vertical sides of the passageway frame 16 are mounted vertically acting support bellows or air springs 18 which are preferably air-pressurized by having their top portions interconnected with air reservoirs 19 carried by transverse supports 20 structurally interconnecting the passageway frame 16 with the outer walls of the car body 11. The air springs 18 are in the form of cylindrical bellows which may be made from fiberized rubber or the like and which, when inflated, are compressed in response to variations in loads carried by the car 10. A source (not shown) of pressurized fluid, such as compressed air, is connected to the reservoirs 19 through leveling valves 21 which in turn are operated by linkages 22 interconnected with air spring yokes 23 being provided with spaced arms 24 in the form of wishbones which extend between the side walls of the car body 11 and the yokes 23 which in turn are connected to the bottom portions of the air springs 18. The outermost ends of the arms 24 are pivotally attached to the shell of the car body 11 by brackets 25 mounted on the interior thereof which are provided with spaced ears 26 (Fig. 3) between which eyes 27 formed integrally on the ends of the arms 24, are received. Pins 28 are passed through aligned holes in the ears 26 and eyes 27 and preferably are rubber bushed to reduce noise and vibrations. The yokes 23 carried on the inner ends of the arms 24 are allowed to rise and fall while being restrained from longitudinal movement with respect to the car body 11 so as to maintain the air springs 18 upright with respect to the car body 11, as will subsequently be more clearly described.

As shown particularly in Fig. 4, the bottom surface of each of the yokes 23 is attached to the top of a resilient cushion 29 supported on a reinforced plate 30. The plates 30 are provided with trunnions 31 which, for lightness, are hollow as indicated by the numeral 32 in Fig. 5. Each of the trunnions 31 has an abutment or shoulder 33 which is longer or deeper at the bottom than at the top thereof. Each trunnion 31 is drilled from the outer end to receive a plug 34 held in place by a pin 35. The outer end of each plug 34 is threaded to receive a nut 36 which holds a cap 37 into engagement with the end of the trunnion 31.

Each trunnion 31 receives a rubber torsion or rubber bushed sleeve assembly 38 carried in a cylindrical sleeve 39 on the upper end of an inclined strut 40. The lower end of the strut has a similar rubber bushed cylindrical sleeve 41 carrying a rubber torsion sleeve assembly 42 about the relieved outer periphery, defined by a shoulder 43, of a trunnion 44 formed on one side of a saddle member 45 attached to the top half of the outer periphery of the journal box 17. The saddle member 45 is shown as a casting provided with hollow trunnions 44, the central hollow area being indicated by the numeral 46. The outer end of each trunnion 44 is axially drilled to receive a plug 47 held in place by a pin 48 as shown. The outer end of each plug 47 is threaded and receives a nut 49 which holds in place a cap 50. The caps 37 and 50 are of sufficient diameter to secure the sleeves 39 and 41 on the trunnions 31 and 44.

The saddle member 45 is provided on opposite sides with flanges 51 having holes therein aligned with holes in mating flanges 52 integral with a bottom saddle member 53 carried by the journal box 17. The top and bottom saddle members 45 and 53 are interconnected by bolts 54 passing through the holes in the flanges 51 and 52. The bottom saddle member 53 is provided on opposite sides with outwardly directed pairs of spaced apertured ears 55 which receive therebetween an eye 56 formed on the end of a connecting rod 57. A pin 58 in the form of a bolt connects eye 58 to the ears 55. The rod 57 may form a part of an axle steering mechanism used to steer the axle 12 with respect to the car 11 when the same is negotiating a curve.

The torsion or rubber bushed sleeve assemblies 38 and 42 are identical in construction and are formed from a plurality of bonded sleeves 59, 60 and 61 (Figs. 4–6). The sleeve 59 is of rigid metal and is bonded to the outer surface of the sleeve 60 which is formed from shear-resistant rubber. The inner surface of the sleeve 60 is bonded to a sleeve 61 of rigid metal and the sleeves 59 and 61 are adapted to move relative to one another, this movement being controlled by the resiliency of the intermediate sleeve 60. As shown in Figs. 4 and 6, the sleeve 59 is fixed to the inner surface of the cylindrical sleeve 39 by keys 62 received in aligned grooves carried by the sleeves 59 and 39. As a result of the keyed interconnection, the sleeve 59 moves with the sleeve 39. The sleeve 61 is also fixed by means of keys 63 to the outer surface of the trunnion 31 in a similar manner. A similar arrangement with respect to the rubber torsion sleeve assembly 42 carried by the stud 44 is also provided. The outer sleeve 59 is keyed to the inner surface of the cylindrical sleeve 41 by keys 64 and moves therewith relative to the inner sleeve 61. Likewise, the inner sleeve 61 is fixed with respect to the trunnion 44 by reason of keys 65 thereby restraining relative movement therebetween.

Due to the resiliency of the sleeves 60 the struts 40 may pivot about the trunnions 31 and 44 during the operation of the railway car 10. The shear strength of the material of the sleeves 60 is greater than the torsional forces applied thereto during the pivotal movement of the struts 40 and the inherent resiliency of the material acts to bias the struts 40 back into their original positions with respect to their associated trunnions 31 and 44 upon a reduction in magnitude of the torsional forces.

The air springs 18 support the weight of the car body 11 and the air pressure therein is automatically regulated in response to variations in loads. For example, adequate air pressure is carried by the air springs initially to support an empty car body 11. As the load in the car body 11 is increased the air springs 18 are compressed and the car body moves downwardly toward the axle 12. The rubber torsion sleeve assemblies 38 and 42 carried at the ends of the struts 40 provide adequate biasing action to maintain the bottoms of the air springs 18 at a substantially constant elevation as long as a dead weight load is merely being applied to the car 10 and the car body 11 is not being subjected to additional forces such as centrifugal force. Therefore, as the dead weight load increases the air springs 18 will compress and the leveling valves 21 will move downwardly toward the arms 24. The linkages 22 being attached to the arms 24 will then operate to open the valves 21 thereby interconnecting the pressurized air supply source with the reservoirs 19 to increase the air pressure within the air springs 18 until the pressure is sufficient to return the car body 11 to its normal elevation with respect to the axle 12. Upon a decrease in load the reverse functioning of the elements bleeds the air springs of excessive pressure.

The struts 40 are interconnected with the bottoms of the air springs 18 by the plates 30 and, due to the presence of the torison sleeve assemblies 38 and 42, the car body 11 is allowed to roll or bank with respect to the axle 12. The car body 11 may pivot laterally by reason of the limited pivotal action provided by the torsion sleeve assemblies 38 and 42 and, as a result, the car body 11, when subjected to the action of centrifugal force, will bank inwardly of a curve when the car 10 is negotiating the same. The biasing action of the torsion sleeve assemblies 38 and 42 function to maintain the car body 11 in an upright position when the same is not subjected to centrifugal force. However, upon the rounding of a curve the biasing action of the torsion sleeve assemblies 38 and 42 is overcome by the action of centrifugal force to an extent that the car body 11 will bank inwardly of the curve. Upon completion of the rounding of the curve, the biasing action no longer being subject to torsional stresses caused by centrifugal force, will reassert itself to cause the struts 40 to return to their original positions and right the car body 11.

Fig. 2 illustrates the banking of the car body 11 upon the negotiation of a curve to the left as viewed in Fig. 2. The pivot points at the ends of the struts 40 allow the car body 11 to roll laterally, the resultant of gravity and centrifugal force acting upon the car body 11 to bank the same into the curve, and the struts 40 are turned about their pivotal connection with the journal boxes 17 in a clockwise direction. The biaisng action of the torsion sleeve assemblies 38 and 42 is overcome and the car body 11 is allowed to bank to a limited degree. The struts 40 are provided with bumpers 66 mounted intermediate the ends thereof and provided with inwardly directed rubber cushions 67 which abut vertical plates 68 carried by the passageway frame 16. As shown in Fig. 2, the cushion 67 of the right-hand bumper 66 is compressed against the plate 68 and the final degree of bank taken by the car body 11 is limited to this extent. This limiting action prevents over-banking of the car body 11 as well as damage to the torsion sleeve assemblies by action of torsional forces of a magnitude greater than the resilient rating of the sleeves 60.

During the banking of the car 10 the air springs 18 and restraining arms 24 maintain their respective relation, as illustrated in Fig. 2, and it is only the struts 40 which are caused to turn about their pivotal end connections. In the event that a steering mechanism is used to steer the axle 12 around curves, the axle will be horizontally turned relative to the car body 11. Such relative movement would cause the air springs 18 to be twisted or moved longitudinally with respect to the car body 11 but for the provision of the restraining arms 24 and the resilient cushion 29. The struts 40 can only pivot to a limited extent in a longitudinal plane. However, in the event that the axle 12 is steered relative to the car body 11, struts 40 and the plates 30 are allowed to move sufficiently with respect to the vertical axis of the air spring 18 by reason of the resiliency of the cushions 29. The air springs 18 will be maintained in their upright position by the restraining arms 24 at all times and upon completion of negotiation of a curve the axle steering mechanism will be positively returned to its initial positon and the biasing action of the resilient cushions 29 will act to return the struts 40 and plates 30 to their positions with respect to the car body 11. The cushions 29 further function to absorb the vertical components of impact forces transmitted axially of the struts 40 so that these components will not be transmitted to the body 11 through the restraining arms 24.

In certain instances it may be desirable to rely upon self-steering of the axle brought about by the camming action of the rails 15 on the flanges 14 of the wheels 13. Self-steering action is available as the axle 12 may turn relative to the car body 11 against the biasing action of the resilient cushions 29 and ultimately be biased into returning to its normal position by the inherent resiliency of the cushions 29.

The yokes 23 and restraining arms 24, as previously described, function to maintain the air springs 18 in an upright position. In maintaining this relation these elements not only fixedly position the air springs with respect to the shell of the car body 11 and limit the air springs 18 from longitudinal movement while allowing vertical movement of the same, but still further function to restrain movement of the axle 12 along the longitudinal axis of the car body 11. As the struts 40 pivot with respect to the air springs 18 and journal boxes 17 in transverse planes, any movement of the axle longitudinally of the car body 11 would, without the provision of the yokes 23 and their associated restraining arms 24, cause the air springs 18 to be moved forwardly or rearwardly of the car body 11. Such movement would of course be undesirable and, as a result, the combination of the limited movement of the yokes 23 and the limited pivotal interconnection of the struts 40 with both the air springs 18 and the journal boxes 17 restrains relative longitudinal movement between the axle 12 and the car body 11.

The journal box saddle members 45 and 53 may be readily dismounted from the journal boxes 17 by merely retracting the bolts 54 and removing the bottom saddle member 53. In the event that it is necessary to rework the axle 12 or repair the journal boxes 17 or wheels 13, the car body 11 may be raised from supporting contact with the journal boxes 17 by merely jacking up the top saddle member 45. As a result, maintenance may be accomplished without the necessity of disassembling the suspension system.

The rubber torsion sleeve assemblies 38 and 42 may be varied with respect to their baising strength. The stiffness of the resilient sleeves 60 is set during the manufacturing thereof and, depending upon the normal operating conditions expected, sleeves of varying stiffness may be used. The rubber torsion sleeve assemblies may be readily removed from the suspension system and, in the event that the operating conditions should be changed, sleeves of greater or less resilient strength may be readily substituted for those in use. The provision of torsion sleeve assemblies at both ends of the struts 40 in association with the air springs 18 and the journal boxes 17 results not only in the biasing action necessary to normally maintain the car body 11 in an upright position being shared and, as a result, less wear on a single torsion sleeve assembly, but also allows the restraining arms 24 to function in restricting relative movement between the axle 12 and the car body 11 longitudinally of the car body 11.

From the above description it is readily apparent that the improved suspension system of the present invention exhibits many desirable features from practical manufacturing and maintenance standpoints. Each side assembly of the suspension system is ruggedly constructed, readily assembled and inexpensively maintained. The various elements of the suspension system are readily accessible for maintenance purposes and these elements are arranged to function in such a manner that long life operation is obtained.

Certain modifications and changes in the foregoing embodiment may be made without departing from the spirit and scope of the invention and, therefore, only such limitations should be imposed as are indicated in the appended claims.

I claim:

1. A suspension system resiliently supporting a vehicle body on an axle, said system including vertically acting springs carried by said body and being laterally spaced with respect to the longitudinal axis of said body, oppositely directed first trunnion means mounted at the base of each of said springs, journal boxes mounted on each end of said axle, oppositely directed second trunnion means carried by each of said journal boxes, a pair of struts extending between said springs and journal boxes on each side of the longitudinal axis of said body, torsion sleeve assemblies on each of said trunnion means and having the ends of said struts mounted thereto to interconnect said springs with said journal boxes and provide for limited pivotal movement of said struts about both of said trunnion means, said torsion sleeve assemblies each including a shear-resistant sleeve of resilient material having its inner surface bonded to a rigid sleeve which is fixed on a trunnion means about which a strut pivots, and its outer surface bonded to a rigid sleeve which is fixed to a strut end, said resilient material allowing limited rotational movement of said outer sleeve with respect to said inner sleeve and acting to return said outer sleeve to its initial position relative to said inner sleeve as a result of the torsional stresses applied thereto, and restraining means connected to and between said springs and said body to limit movement of said axle and said system longitudinally of said body.

2. The system of claim 1 wherein each of said strut ends is in the form of a sleeve received about an associated rigid outer sleeve of a torsion sleeve assembly, key means extending longitudinally of said strut end sleeve and said rigid outer sleeve and interconnecting the same to prevent relative rotational movement therebetween while permitting longitudinal displacement of said strut end from said torsion sleeve assembly.

3. A suspension system resiliently supporting a vehicle body on an axle, said system including vertically acting fluid pressurized springs carried by said body and being laterally spaced with respect to the longitudinal axis of said body, oppositely directed first trunnion means mounted at the base of each of said springs, journal boxes mounted on each end of said axle, oppositely directed second trunnion means carried by each of said journal boxes, a pair of struts extending between said springs and journal boxes on each side of the longitudinal axis of said body, torsion sleeve assemblies on each of said trunnion means and having the ends of said struts mounted thereto to interconnect said springs with said journal boxes and provide for limited pivotal movement of said struts about both of said trunnion means, said torsion sleeve assemblies each including a shear-resistant sleeve of resilient material having its inner surface bonded to a rigid sleeve which is fixed on a trunnion means about which a strut pivots, and its outer surface bonded to a rigid sleeve which is fixed to a strut end, said resilient material allowing limited rotational movement of said outer sleeve with respect to said inner sleeve and acting to return said outer sleeve to its initial position relative to said inner sleeve as a result of the torsional stresses applied thereto, restraining means connected to and between said springs and said body to limit movement of said axle and said system longitudinally of said body, said restraining means being pivotally connected to said body to permit movement of said body relative thereto, fluid supply means carried by said body and in communication with said springs, and fluid supply control means connected to said restraining means and forming a part of said fluid supply means to regulate the fluid pressure of said springs in response to relative movement between said restraining means and said body.

References Cited in the file of this patent

UNITED STATES PATENTS

| | | |
|---|---|---|
| 2,243,854 | Christianson et al. | June 3, 1941 |
| 2,268,439 | Beebe | Dec. 30, 1941 |
| 2,361,575 | Thompson | Oct. 31, 1944 |
| 2,474,471 | Dolan | June 28, 1949 |
| 2,537,637 | Candlin | Jan. 9, 1951 |
| 2,670,201 | Rossman | Feb. 23, 1954 |
| 2,685,845 | Gassner et al. | Aug. 10, 1954 |
| 2,687,099 | MacVeigh | Aug. 24, 1954 |
| 2,691,420 | Fox et al. | Oct. 12, 1954 |
| 2,773,686 | Nash | Dec. 11, 1956 |
| 2,781,731 | Furrer | Feb. 19, 1957 |
| 2,785,640 | Furrer | Mar. 19, 1957 |
| 2,893,326 | Browne et al. | July 7, 1959 |

FOREIGN PATENTS

| | | |
|---|---|---|
| 157,620 | Australia | July 13, 1954 |
| 1,064,820 | France | Dec. 30, 1953 |